Aug. 8, 1944.    M. C. YEASTING    2,355,254
DYNAMOMETER
Filed Jan. 18, 1941    3 Sheets-Sheet 2
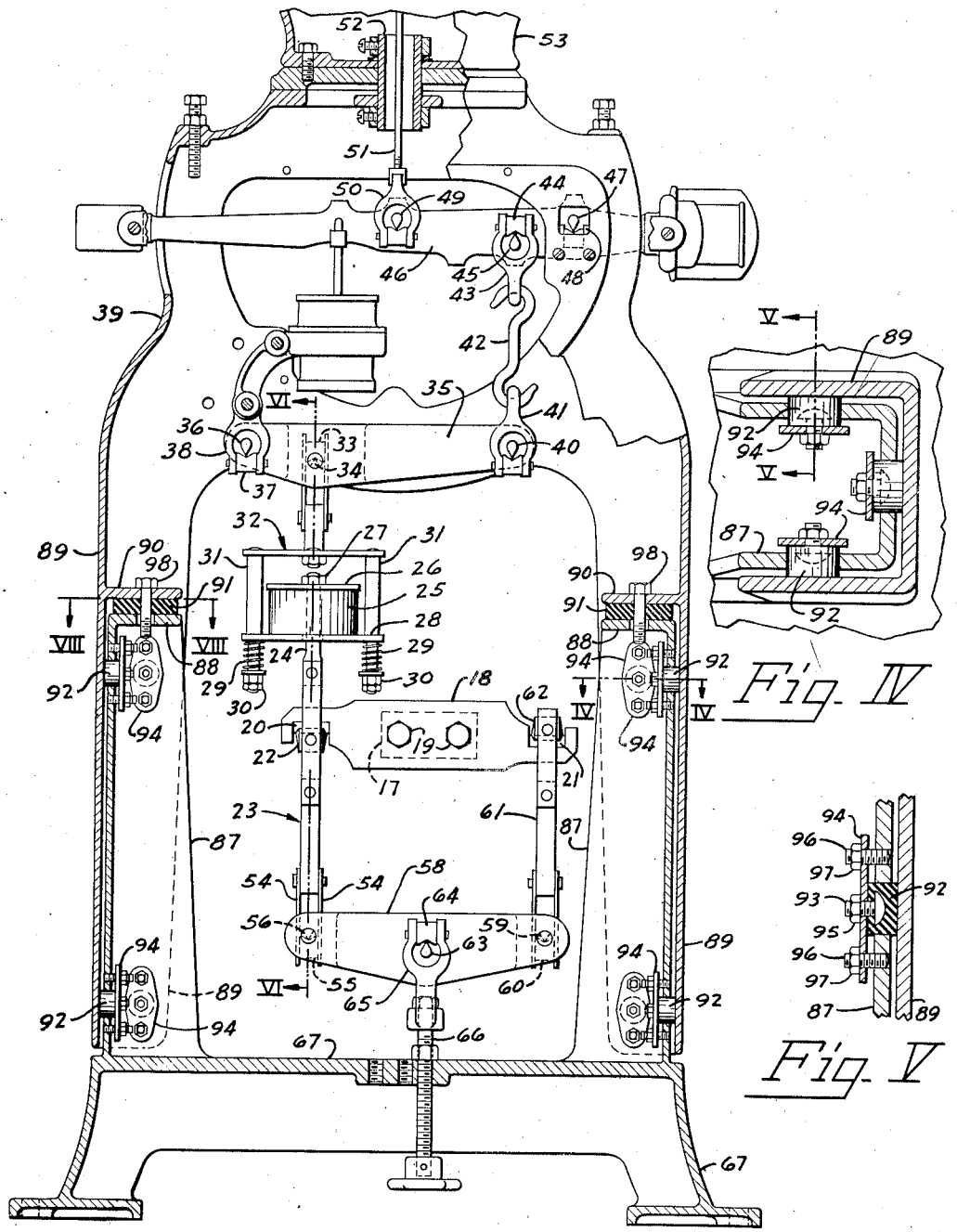
Fig. III
Fig. IV
Fig. V
Maynard C. Yeasting
INVENTOR
BY Marshall & Marshall
ATTORNEYS Aug. 8, 1944.  M. C. YEASTING  2,355,254
DYNAMOMETER
Filed Jan. 18, 1941   3 Sheets-Sheet 3
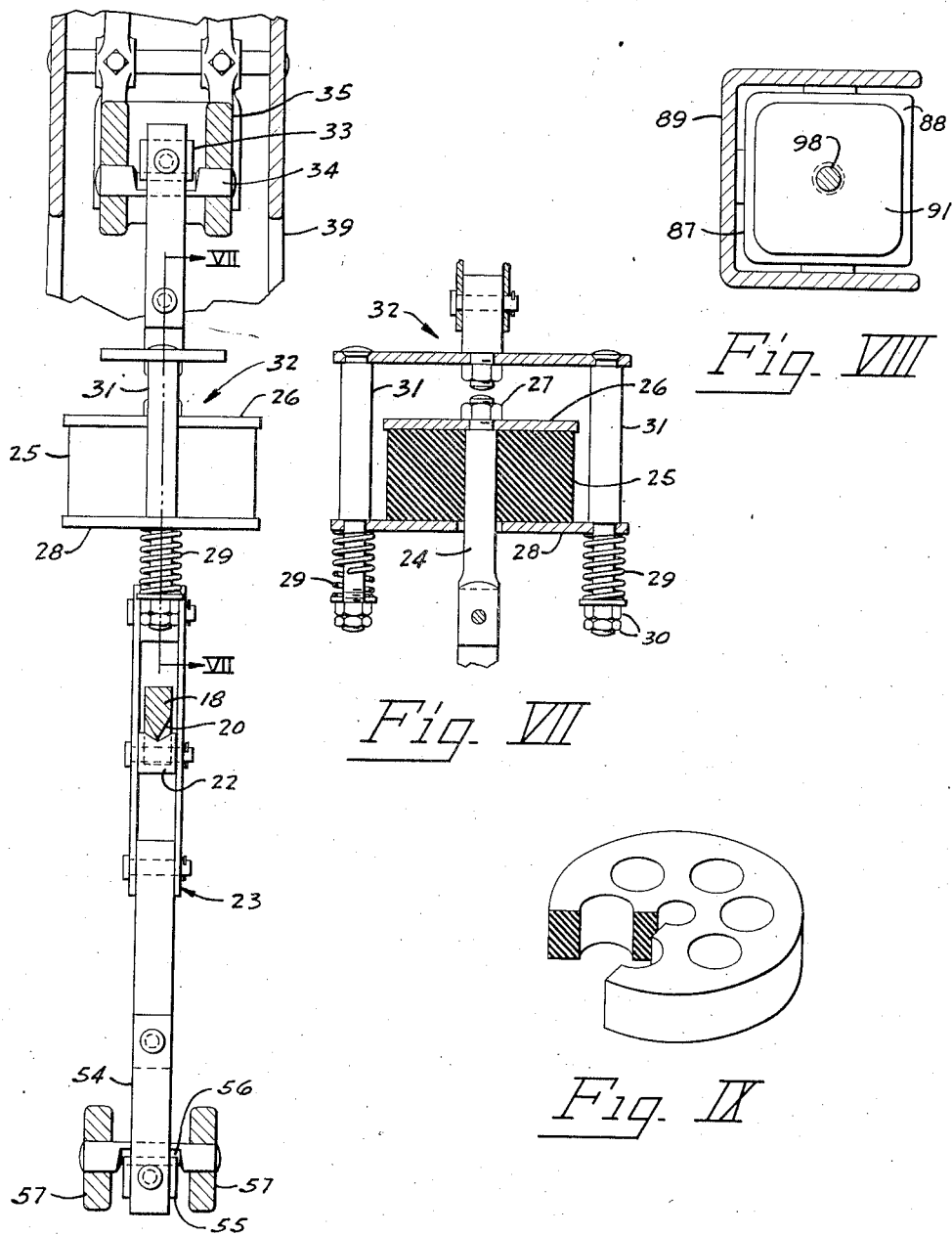
Maynard C. Yeasting
INVENTOR
BY Marshall & Marshall
ATTORNEYS Patented Aug. 8, 1944

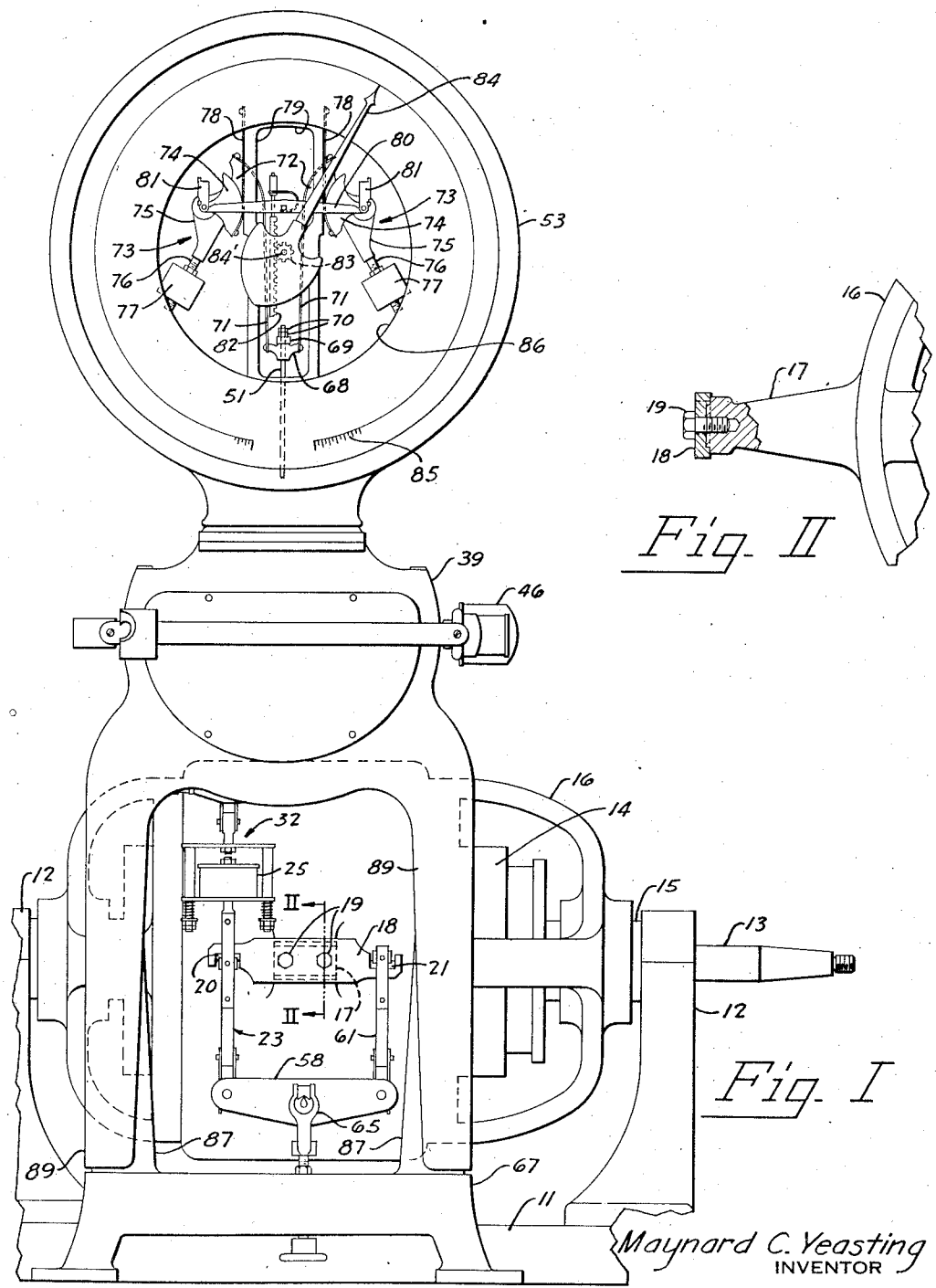

2,355,254

UNITED STATES PATENT OFFICE 2,355,254

DYNAMOMETER

Maynard C. Yeasting, Highland Park, Mich., assignor, by mesne assignments, to Toledo Scale Company, Toledo, Ohio, a corporation of New Jersey Application January 18, 1941, Serial No. 375,027

1 Claim. (Cl. 265—24)

This invention relates generally to force measuring devices, and more particularly to dynamometers employed in measuring and automatically indicating torque inputs and outputs transmitted to or by rotating shafts. Such dynamometers usually are provided with rotors to which such shafts are coupled and frames which are mounted on trunnions concentric with the rotor shafts in such a manner that they can oscillate freely about the shaft axis. The frames are also each provided with an exteriorly extending arm by means of which they are operatively connected to force counterbalancing mechanism and force indicating means actuated by the force counterbalancing mechanism.

When the rotor rotates, vibrations may be set up in the frame supporting the force counterbalancing mechanism and the indicating means. These vibrations under certain circumstances interfere with the exact indication of the torque input or output being measured and under some conditions they are destructive of pivots and bearings subjected to such vibrations.

In order to prevent these undesirable results, such vibrations must be damped or cushioned before reaching the force counterbalancing and indicating mechanism so that the accuracy of this mechanism will not be diminished. The vibrations resulting from the rotation of the mechanism being tested and the rotor itself are divided into two main resultant vibrations: vertical and horizontal. These vibrations may be referred to as reciprocatory, nonrocking vibrations. Vertical reciprocatory vibrations have been damped in some constructions by mounting the force counterbalancing and indicating mechanism in free floating suspension means such as springs or resilient cushions but such mountings do not prevent horizontal reciprocatory vibration and, even more important, do not prevent angular vibration of the force counterbalancing and indicating mechanism housing, which angular vibration is due to and results from such reciprocatory horizontal vibration.

This angular vibration, as distinguished from the horizontal reciprocatory vibration, is the result of forces acting on the mechanism housing to shift or vibrate it about either its point of connection to the dynamometer frame or its mounting on the floor or, if it is mounted in free floating suspension means, about its center of gravity. The result of such angular shift or vibration is that the direction of connection between the dynamometer frame and the force counterbalancing and indicating mechanism is constantly changing from a direction tangential to the arc of movement of the connection point with the dynamometer frame to lines of movement at various angular relations to such arc. Changes in this direction of connection destroy the accuracy of the readings given by the instrument.

The principal object of this invention is the provision of improved means for controlling such angular vibrations.

Another object is the provision of means for changing the periodicity of the framework supporting force counterbalancing mechanism and indicating means.

Still another object is the provision of resilient means for cushioning vibrations.

These, and other objects and advantages will be apparent from the following description in which reference is had to the accompanying drawings, illustrating a preferred embodiment of the invention and wherein similar reference numerals refer to similar parts throughout the several views.

In the drawings:

Fig. I is a front elevational view of a dynamometer embodying the invention.

Fig. II is an enlarged fragment of a rockable frame showing particularly the extending coupling arm and a knife edge plate secured thereto.

Fig. III is an enlarged elevational view of the lower part of the force counterbalancing mechanism supporting frame.

Fig. IV is an enlarged fragmentary horizontal sectional view along the line IV—IV of Fig. III.

Fig. V is an enlarged fragmentary sectional view substantially along the line V—V of Fig. IV.

Fig. VI is an enlarged sectional view through parts of the frame members along the line VI—VI of Fig. III.

Fig. VII is a sectional view substantially along the line VII—VII of Fig. VI.

Fig. VIII is a sectional view substantially along the line VIII—VIII of Fig. III; and, Fig. IX is a perspective view of one form of a resilient cushioning member.

Referring to the drawings in detail:

The device comprises a base 11 having two upwardly extending spaced brackets 12. These brackets 12 are provided with bearings near their upper extremities for a shaft 13 of a rotor 14, which shaft is journaled through trunnions 15 for mounting a rockable frame 16 concentric to the rotor 14. Extending from the rockable frame 16 is an arm 17, the end of which is suitably machined so as to invariably position a pivot plate 18 which is retained by means of bolts 19. The opposite ends of the plate 18 are provided with knife edges 20 and 21, the knife edge 20 being downwardly directed and the knife edge 21 being directed upwardly. The knife edge 20 engages a hardened steel V bearing 22 in a stirrup 23. The upper end of the stirrup 23 is pivotally connected to a short threaded rod 24 extending through a biscuit of rubber 25 and a steel plate 26 situated on the upper face of the biscuit. A nut 27 is threaded upon a portion of the rod 24 extending beyond the opposite side of the plate 26 and serves to maintain the rod 24 with its attached stirrup 23 in position. The rubber biscuit 25 is positioned on a metallic plate 28 resiliently mounted, by means of springs 29 and nuts 30, on spaced shouldered rods 31 which form a part of a stirrup assembly 32. This stirrup assembly 32 is suspended, through the cooperation of a hardened steel V bearing 33, from a load pivot 34 in an intermediate lever 35 of the second order which, by means of a pivot 36, is fulcrumed upon a suitable bearing 37 in a fulcrum bracket 38 in the interior of an upstanding frame 39. A power pivot 40, in the opposite end of the intermediate lever 35, engages a stirrup 41 which, by means of a connecting link 42, is suspended from a stirrup 43. The stirrup 43 acts through a bearing 44 upon a load pivot 45 of a beam lever 46. This beam lever is fulcrumed, by means of a pivot 47, upon a suitable fulcrum bracket 48 fixedly positioned in the interior of a contracted portion of the upstanding frame 39.

A power pivot 49, in spaced relation to the pivots 45 and 47 of the beam lever 46, engages a suitable bearing in a stirrup 50 fixed on the lower end of a connecting rod 51 whose upper end extends through a bushing 52 into the interior of a substantially watchcase-shaped housing 53 surmounting the upstanding frame 39, the bushing 52 forming a fulcrum for the housing 53 thus permitting the housing 53 to be angularly positioned with respect to a plane passing from side to side through the frame 39.

Plates 54, pivotally suspended from opposite faces of the stirrup 23, pivotally support a hardened steel V bearing 55 which engages a knife edge pivot 56 extending between spaced arms 57 of a reversing lever 58. A similar pivot 59 in the opposite end of the reversing lever engages a bearing 60 adjacent the lower end of a stirrup member 61 whose upper end is suspended, by means of a suitable bearing 62, from the knife edge 21 of the pivot plate 18 which is secured to the rockable frame 16. A pivot 63, extending laterally through the reversing lever 58, engages a bearing 64 in a stirrup 65, whose lower end is freely retained to the end of a screw bolt 66, threaded through the bottom of a frame stand 67 adapted to be secured in proper position adjacent the base 11.

The upper end of the connecting rod 51, whose lower end, by means of a stirrup 50, engages the power pivot 49 of the beam lever 46 extends through a crosshead 68 and a thrust ball bearing 69, which is interposed between the upper face of the crosshead and locked nuts 70 threaded upon the upper end of the connecting rod 51 so that the casing 53 may be turned about its pivot 52 without deranging the position of the connecting rod 51.

Flexible metallic ribbons 71, whose lower ends are clamped to opposite faces of the crosshead 68 and whose upper ends overlie and are clamped to arcuate faces of power sectors 72, serve to operatively couple the rockable frame 16 to load counterbalancing pendulums 73; the power sectors 72 forming component parts of these pendulums. In addition to the power sectors 72 each pendulum 73 comprises a pair of fulcrum sectors 74, a pendulum body 75, a threaded stem 76 studded into the pendulum body and a pendulum weight 77 adjustably threaded upon the stem 76. Flexible metallic ribbons 78, whose upper ends are clamped to parallel faces of a pendulum frame 79 mounted in the interior of the housing 53, have their lower ends overlying and clamped to the lower ends of arcuate faces of the fulcrum sectors 74 thus serving to rockably support the load counterbalancing pendulums 73.

A so-called compensating frame, comprising a pair of plates 80 and connecting yokes 81, pivotally connects the centers of revolution of these pendulums and thus partakes of their reciprocatory movements on the pendulum frame 79 when acted upon by a force transmitted through the rod 51. A rack 82 pivotally suspended from a point midway of the points of pivotal attachment to the pendulums, cooperates with a pinion 83 circumjacently mounted upon an indicator shaft 84' that is journaled in antifriction bearings (not shown) in flanges of the pendulum frame 79. The rack serves to rotate an indicator 84 fixed to the shaft 84' through an angle proportional to the magnitude of the force and this indicator thus serves to visually indicate the force in cooperation with an arcuate series 85 of indicia printed or otherwise marked upon a chart 86 mounted in the housing 53.

As hereinbefore mentioned, the principal object of the invention is the provision of a structure which is adapted to damp vibrations occasioned by the operation of a machine being tested and rotating parts of the testing apparatus. The means supporting the mechanism according to this invention may be of substantially the same general shape as that heretofore employed but it is divided into the supporting frame member 39 and the frame stand 67.

The frame stand 67 is provided with upright posts 87 of channel-shaped cross section having horizontal flanges 88 at their upper extremities. The supporting frame 39 is provided with depending legs 89, also of channel-shaped cross section, within which the posts 87 are telescoped, the webs of the posts 87 and legs 89 being disposed adjacent each other and located at the outer sides of the frame. A flange 90 extends across the interior of each channel-shaped leg 89 in spaced opposed relation to the flange 88 of each associated post 87. Disposed between each pair of opposed flanges 88 and 90 is a rubber pad 91, which is adapted to yieldably sustain the entire weight of the frame member 39, the load counterbalancing mechanism, and the load indicating means in addition to the force applied to them through the linkage.

The legs 89 of the frame extend substantially throughout the entire lengths of the posts 87 in overlapping relation thereto. The lower end portions of the side flanges and webs of the legs 89 are spaced from the corresponding side flanges and webs of the posts 87 by flat rubber biscuits 92. Each rubber biscuit 92 is mounted upon a bolt 93 which extends through an aperture of a plate 94. The rubber biscuit 92, by means of the bolt 93, is clamped to the plate 94 by means of a nut 95. The plate 94 is provided with apertures on its longitudinal axis, one on each side of the bolt 93. These apertures are spaced to receive threaded members 96, studded into the flanges and webs of the posts 87. Apertures are also provided in the flanges and webs of the posts 87 so that the rubber biscuits which are clamped to the plates 94 may project therethrough and engage the flanges and webs of the legs 89. Nuts 97 threaded on the members 96 are provided so that these rubber biscuits may be caused to engage the inner surfaces of the flanges and webs of the legs 89 with any desired pressure. Although in many instances the provision of the elastic means, that is the biscuits 92, just described provided at the lower extremities of the legs 89 is sufficient, in certain installations it may be desirable that they be duplicated adjacent the upper ends of the posts 87.

The entire yieldably supported mass is free to move within limits transversely in a horizontal plane as well as to rock about diverse axes, and the mountings are so constructed and arranged that the natural frequency of the resilient supported mass in any direction in which it is free to move is of a value lower than the frequency of the impulses tending to vibrate the mass in any of these directions.

The rubber pads 91 are so predetermined in rate as to bring the natural vibration frequency of the supporting frame and mechanism mounted thereon to a lower value than the frequency of the impulses applied thereto which tend to vibrate the device and the frame relative to the stand 67. The natural vibration frequency rate produced by the pads 91 can be brought below the frequency of such impulses without making the pads so soft that they accommodate an excessive amplitude of vertical movement of the device and the frame member 39. If the pads 91 are made excessively soft, the resulting excessive movement of the device and the frame member tends to introduce errors, due to the resulting angularity of the reversing lever 58 and displacement of the pivot plate 18 from the horizontal plane through the axis of the rockable frame. It has been found that this condition can be avoided while still using pads of low enough rate to bring the natural vibration of the device and frame below the range of the frequency of the impulses produced during use.

The rubber biscuits 92 serve to laterally stabilize the supporting frame. This purpose is accomplished by the biscuits 92 by loosely engaging the side flanges and webs of the legs 89. Because of such comparatively loose engagement, the biscuits normally slide relative to the side surfaces and webs. Hence in addition to their stabilizing function the biscuits, by sliding upon the surfaces engaged by them, introduce a vibration damping effect.

The ratio of the lever systems in devices of this kind is customarily varied to suit the power output or input of the machine being tested by changing the pivot distances of the levers 35, 46 and the position of the fulcrum of the reversing lever 58 with respect to a vertical plane passing laterally through the center of the device. When, for example, the pivot 34 of the lever 35 is spaced from the aforementioned plane passing through the center of the device a distance so that the force transmitted is very unequally distributed upon the pads 91, it may be necessary to give the two pads different physical characteristics to compensate for the unequal distribution of the force. This may be accomplished by changing the area of one of the pads, making one of the pads from material which has different elastic characteristics, or by maintaining the same superficial area and elastic characteristics of the material, but providing a number of apertures in the pad, as shown in Fig. IX.

The rubber biscuit 25 in the stirrup assembly 32 cooperates with the pads 91 and the rubber biscuits 92 to cushion vibrations imparted to the device. The springs 29 in the stirrup assembly 32, however, are normally ineffective because they clamp the plate 28 against the shoulders of the bolts 31, but when the rod 24 is subjected to a violent jerk, the springs 29 are compressed, and by their elastic resistance protect the pivots and bearings and other parts of the device which otherwise may be damaged by the violent application of a force.

Bolts 98 are provided to pass vertically through aligned apertures in the flanges 88, 90 and the pads 91, and during transportation nuts threaded on the bolts 98 serve to clamp the frame member 39 and the frame stand 67 together. During the operation of the device, however, the nuts must be, and the bolts may be, removed, so that the frame member 39 is supported entirely by the resilient pads 91.

The embodiments of the invention herein shown and described are to be regarded as illustrative only, and it is to be understood that the invention is susceptible to variation, modification and change within the spirit and scope of the subjoined claim.

Having described the invention, I claim:

Vibration isolating means for a force counterbalancing and indicating mechanism adapted to counterbalance and indicate the force exerted between a relatively heavy force producing means and its base, said force producing means being connected to said mechanism by a force transmission means, said force producing means also generating vibrations which are transmitted to said base, comprising in combination, a frame mounted adjacent said base, a frame work for said mechanism having depending legs telescopically overlapping said frame, resilient means interposed between said frame and said frame work at the upper and lower extremities of the overlapped portions thereof for vibrationally isolating said framework from said frame, and a resilient connection in said force transmission means adapted to transmit steady force to said mechanism, whereby said force counterbalancing and indicating mechanism is subjected to the steady force of said force producing means and is isolated from vibrations generated therein.

MAYNARD C. YEASTING.